July 27, 1937.   D. D. MIZZY   2,088,304
APPARATUS FOR PREPARING AMALGAM FOR DENTAL AND OTHER USES
Filed May 21, 1935
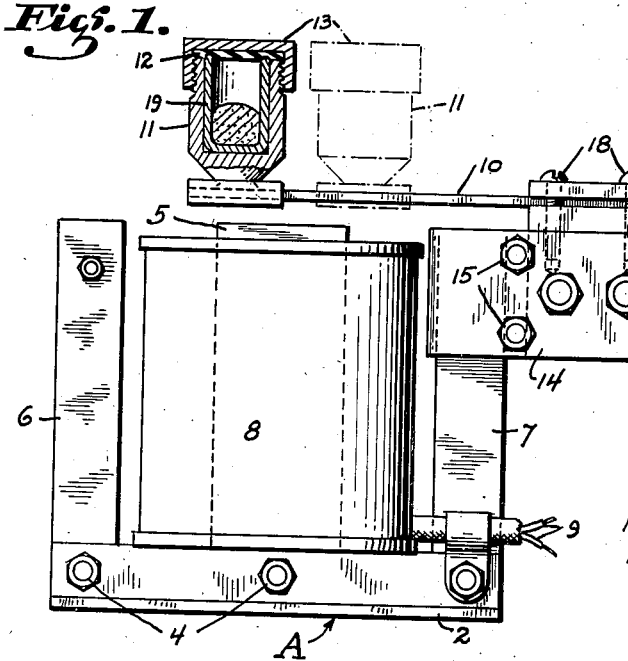
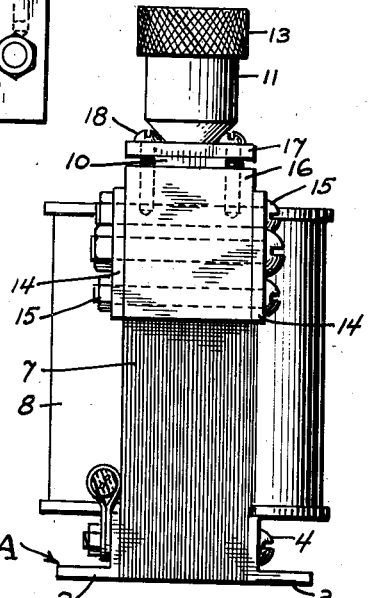
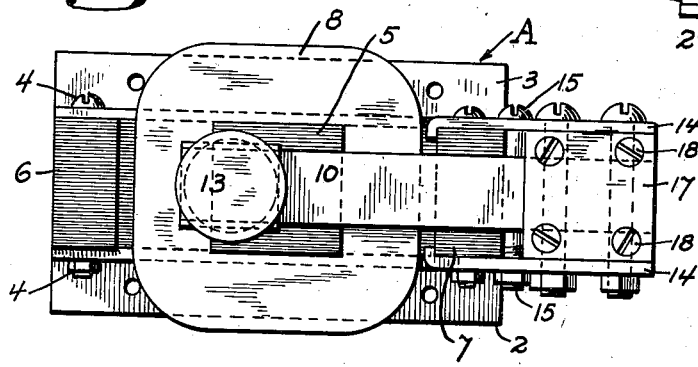
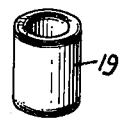
INVENTOR.
Dan D. Mizzy
BY
Chas. E. Townsend.
ATTORNEY Patented July 27, 1937

2,088,304

UNITED STATES PATENT OFFICE 2,088,304

APPARATUS FOR PREPARING AMALGAM FOR DENTAL AND OTHER USES

Dan D. Mizzy, Sacramento, Calif.

Application May 21, 1935, Serial No. 22,538

3 Claims. (Cl. 259—72)

This invention relates to an apparatus for preparing amalgam for dental and other uses, and particularly to a vibrator whereby the amalgam may be quickly prepared.

Amalgam, such as used by dentists, should be prepared immediately before use, owing to the fact that the amalgam sets or hardens very quickly after it is prepared. In general practice the dentists will mix the metal and the quick silver forming the amalgam either by kneading them together in the palm of the hand, or by means of a small mortar and a pestle. Either operation is slow and troublesome. The thoroughness of the mixture and the quality of the amalgam obtained will vary depending upon the skill of the operator and time is consumed which will otherwise be used in preparing the tooth cavity for the reception of the amalgam.

The object of the present invention is generally to improve and simplify the construction and operation of apparatus for preparing amalgam; to provide an electromagnet actuated by an alternating electric current and an armature operated thereby; to provide a receptacle for the reception of the metal and the quick silver to be mixed; to provide means for securing the receptacle to the armature whereby the contents of the receptacle will be subjected to rapid, violent, vibratory movement and a thorough mixing action obtained; and, further, to provide means for adjusting the position of the armature with relation to the core of the magnet whereby the stroke or vibratory movement of the armature and the receptacle carried thereby may be varied.

The apparatus for preparing the amalgam is shown by way of illustration in the accompanying drawing, in which—

Fig. 1 is a side elevation partially in section of the apparatus;

Fig. 2 is an end view of Fig. 1;

Fig. 3 is a plan view of Fig. 1;

Fig. 4 is a perspective view of the container provided for the reception of the metal and quick silver to be mixed.

Referring to the drawing in detail, and particularly Figs. 1 and 2, A indicates a base member composed of a pair of angle bars 2 and 3 between which are clamped, by means of bolts 4, or the like, a series of soft iron laminations forming a central core 5 and side poles 6 and 7, and surrounding the central core or pole piece is an inductively wound coil 8; the terminal ends of which are indicated at 9, said ends being connected with a suitable source of alternating current supply and a switch or plug (not shown) being employed to make or break the circuit.

Positioned in the magnetic field above the pole pieces is an armature arm 10 and secured to the free end thereof is a receptacle 11, which is provided with a gasket 12 and a screw cover 13. The armature arm is adjustably supported so that the stroke or amplitude of vibration to which the arm is subjected may be varied. The adjustable support comprises a pair of side plates 14—14 secured to the upper end of the pole-piece 7 by means of clamping screws 15. Between these plates is secured a block 16, preferably constructed of a non-magnetic material. This block forms a support for the fixed end of the armature arm and it is secured thereto by a cross plate 17 and clamping screws 18. By loosening the screws the armature arm, together with the receptacle carried thereby, may be moved outwardly or inwardly with relation to the central pole-piece, as clearly shown in Fig. 1, and the amplitude of vibration may accordingly be varied.

In actual operation when the amalgam is to be prepared a container 19 is employed. The metal to be amalgamated, together with the quick silver employed, is placed in the container and this is, in turn, placed in the receptacle 11 shown in Fig. 1, after which the gasket and the screw cap 13 are applied and tightly screwed down so as to prevent any loss of mercury. The circuit through the inductively wound coil 8 is then closed by the switch, or other suitable means, and as the alternating current flows therethrough the armature arm will be attracted and released, the number of vibrations obtained depending upon the cycle of the current employed and the stroke or amplitude obtained depending upon the position of the armature with relation to the magnetic field. For instance, by adjusting the armature arm to assume the position shown in full lines in Fig. 1, the longest stroke or greatest amplitude of vibration is obtained. By adjusting the arm and receptacle inwardly as indicated by dotted lines in Fig. 1, the amplitude of vibration is reduced. A few experiments will quickly determine the most efficient position and when this is obtained the adjustment will remain fixed.

The actual time required to obtain a thorough mixture is from one to two minutes, this being a comparatively short period when comparison is made with common practice, as mixing in the palm of the hand or in a mortar, usually requires ten minutes. By employing an apparatus as here shown the amalgam is quickly prepared. It is thoroughly mixed; conditions maintained are sanitary; any danger of the operator becoming mercurially poisoned is prevented and time is saved. The small container 19 is readily removed or replaced in the receptacle 11 and all operations are thus quickly and easily accomplished.

The apparatus is small and compact and as such may be placed directly on the dentist's cabinet where it is handy for immediate use and, if desired, the apparatus may be enclosed in an ornamental case. The apparatus may be made of varying sizes depending upon the quantity of amalgam desired. For convenient use directly alongside the dental chair a receptacle of small capacity can be employed. On the other hand if it is intended for laboratory use where a larger quantity of amalgam is required the magnet, together with the receptacle, will obviously be enlarged, and while this and other features have been more or less specifically described and illustrated, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is:—

1. In an apparatus of the character described a base member comprising a pair of bars, a plurality of soft iron laminations clamped between the bars, said laminations forming a central pole-piece and a pair of side poles, an inductively wound coil surrounding the central pole-piece and adapted to be connected with a source of alternating electric current, a bracket secured to one of the side poles, an armature arm supported by the bracket and extending into the magnetic field formed between the ends of the pole-piece, a receptacle secured to the free end of the arm, a container for the reception of the metals to be amalgamated insertable in the receptacle, a cover member for closing the receptacle and the container and a clamping member to adjustably secure the armature arm to the bracket whereby the position of the armature arm with relation to the pole-pieces may be adjusted and the amplitude of vibration varied.

2. In an apparatus of the character described a base member, a plurality of soft iron laminations secured to the base, said laminations forming a central pole-piece and a pair of side poles, an inductively wound coil surrounding the central pole-piece and adapted to be connected with a source of alternating current, a bracket secured to one of the side poles, an armature arm supported by the bracket and extending into the magnetic field formed above the central pole piece, a receptacle to receive the metals to be amalgamated secured to the arm, and means for adjusting the armature arm longitudinally of the bracket to move the arm and the receptacle carried thereby to or away from the central pole-piece.

3. An apparatus for preparing amalgam comprising an armature arm supported at one end, a receptacle for the reception of the metals to be amalgamated supported by the free end of the arm, an alternating current actuated magnet disposed adjacent the free end of the arm whereby vibratory movement is transmitted to the arm and the receptacle supported thereby, and means for moving the receptacle laterally with relation to the magnetic field established by the magnet to vary the amplitude of vibration.

DAN D. MIZZY.